(No Model.)

A. F. FARRELL.
IMPLEMENT FOR OPENING OYSTERS OR CLAMS.

No. 411,797. Patented Oct. 1, 1889.

Witnesses:
S. B. Brewer
Thos. H. Gibbon

Inventor:
ANDREW F FARRELL
by
William H. Low,
Attorney

UNITED STATES PATENT OFFICE.

ANDREW F. FARRELL, OF ALBANY, NEW YORK.

IMPLEMENT FOR OPENING OYSTERS OR CLAMS.

SPECIFICATION forming part of Letters Patent No. 411,797, dated October 1, 1889.

Application filed March 23, 1889. Serial No. 304,437. (No model.)

*To all whom it may concern:*

Be it known that I, ANDREW F. FARRELL, of the city and county of Albany, in the State of New York, have invented a new and useful Implement for Opening Oysters and Clams, of which the following is a specification.

My invention relates to an implement for opening oysters and clams; and it consists of a pair of arms which are pivoted together in the manner of shears, the handles being provided with cutters for removing a portion of the shells of the bivalves, and the outer end of the arms being fashioned to enter the opening produced by said cutters and to pry apart the shells.

Figure 1:
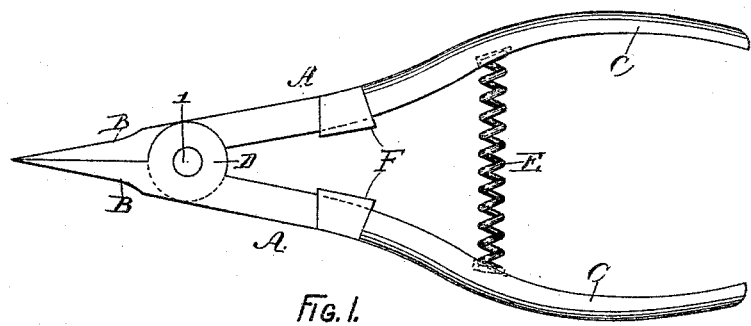
Figure 2:
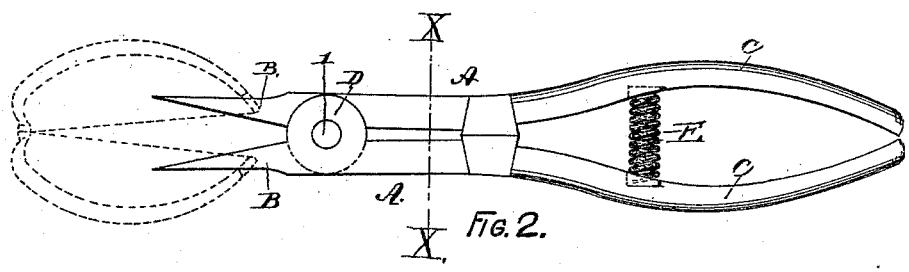
Figure 3:
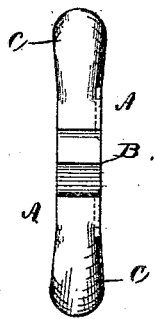
Figure 4:
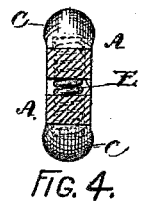

In the accompanying drawings, which are herein referred to and form part of this specification, Figure 1 is a side elevation of my implement in a closed condition. Fig. 2 is a like elevation of the same when opened. Fig. 3 is an end elevation of Fig. 1 looking from the left thereof, and Fig. 4 is a transverse section at the line X X of Fig. 2.

As represented in the drawings, A indicates the arms of my opening implement, which are pivoted together, as at 1, so that the jaws B can be moved apart, as shown in Fig. 2, or closed together, as shown in Fig. 1. Said arms comprise the handles C, jaws B, and joint D, and the outer end of said jaws is reduced in thickness to nearly, or, if preferred, entirely, form a cutting-edge thereon, while toward the joint D said jaws are gradually increased in thickness for the purpose of obtaining sufficient strength to withstand the strain which will be applied to them. A spring E is interposed between the handles C for the purpose of normally retaining the jaws B in close contact with each other. Each handle C is provided with a cutter F, so arranged that the cutting-edges of the pair of cutters will be brought together by moving the handles toward each other.

The mode of operating with my implement is as follows: The oyster being held in one hand of the operator, with my implement in the other hand the mouth end of the oyster-shell is inserted flatwise between the cutters F; then pressure is applied to the handles C to forcibly carry said cutters into contact with each other, and thereby portions of the shell are removed to leave a suitable opening at the mouth end of the shell to permit the jaws B to be inserted therein while the implement is in the closed condition shown in Fig. 1; then by applying pressure to the handles C the jaws B are spread apart to separate the shells, as indicated by dotted lines in Fig. 2, and thereby the operation of opening the oyster will be effected.

When preferred, the end and sides of the jaws B can be made to form knife-edges, which can be utilized for cleanly separating the eyes of the oysters from their shells.

I claim as my invention and desire to secure by Letters Patent—

The herein-described implement for opening oysters and other bivalves, the same comprising a pair of arms which are pivoted together near one end in such manner that a closing movement at one end of said arms will reciprocally produce an opening movement at the opposite end of the same, said arms having at one end a pair of chisel-pointed jaws, and at the opposite end a pair of handles by which said implement is operated, said handles being provided with oppositely-located cutters, and said cutters and jaws located at opposite sides of the pivotal center, and an interposed spring arranged to normally hold said jaws in a closed condition, substantially as herein specified.

ANDREW F. FARRELL.

Witnesses:
WM. H. LOW,
S. B. BREWER.